(12) United States Patent
Grant et al.

(10) Patent No.: US 8,540,571 B2
(45) Date of Patent: Sep. 24, 2013

(54) SYSTEM AND METHOD FOR PROVIDING HAPTIC STIMULUS BASED ON POSITION

(75) Inventors: Danny A. Grant, Laval (CA); Juan Manuel Cruz-Hernandez, Montreal (CA)

(73) Assignee: Immersion Corporation, San Jose, CA (US)

( * ) Notice: Subject to any disclaimer, the term of this patent is extended or adjusted under 35 U.S.C. 154(b) by 588 days.

(21) Appl. No.: 12/751,780

(22) Filed: Mar. 31, 2010

(65) Prior Publication Data

US 2011/0244963 A1 Oct. 6, 2011

(51) Int. Cl.
A63F 9/24 (2006.01)

(52) U.S. Cl.
USPC .............................. 463/37; 345/156; 345/419

(58) Field of Classification Search
None
See application file for complete search history.

(56) References Cited

U.S. PATENT DOCUMENTS

| 7,280,097 B2 * | 10/2007 | Chen et al. .................... 345/156 |
| 2005/0128186 A1 * | 6/2005 | Shahoian et al. ............. 345/161 |
| 2009/0098519 A1 * | 4/2009 | Byerly ........................... 434/247 |
| 2010/0053151 A1 | 3/2010 | Marti et al. |
| 2010/0128112 A1 * | 5/2010 | Marti et al. ....................... 348/51 |
| 2011/0010618 A1 * | 1/2011 | Crawford et al. ............. 715/702 |
| 2011/0118032 A1 * | 5/2011 | Zalewski ........................ 463/39 |

FOREIGN PATENT DOCUMENTS

| EP | 1 916 592 | 4/2008 |
| WO | WO 2005/116809 | 12/2005 |

OTHER PUBLICATIONS

International Search Report and Written Opinion as issued for International Application No. PCT/US2011/030661, dated Sep. 16, 2011.

* cited by examiner

Primary Examiner — David L Lewis
Assistant Examiner — Shauna-Kay Hall
(74) Attorney, Agent, or Firm — Pillsbury Winthrop Shaw Pittman LLP

(57) ABSTRACT

Haptic stimulus associated with other sensory content is generated for conveyance to one or more users with the other sensory content. This may enhance the experience provided to the one or more users by the content. The sensory content may include video content, video game content, audio content, and/or other content. The haptic stimulus may be varied based on position information. Such position information may include information related to the position of the one or more users, the position of a controller (e.g., a game controller), the position of an actuator delivering the haptic stimulus, and/or other position information.

21 Claims, 2 Drawing Sheets

SYSTEM AND METHOD FOR PROVIDING HAPTIC STIMULUS BASED ON POSITION

FIELD OF THE INVENTION

The invention relates to the providing haptic stimulus to users based on position.

BACKGROUND OF THE INVENTION

Systems that provide haptic stimulus to users in conjunction with visual and/or audio content are known. It is generally understood that haptic stimulus may enhance one or more aspects of the experience of the users associated with the content. However, conventional systems do not vary the haptic stimulus based on position information related to the position of the user or a body part of the user. Instead, the haptic feedback is determined and generated without regard for the position of the users, the position of the actuators generating the haptic feedback, the position of the user interface device conveying the visual and/or audio content, and/or other positions.

SUMMARY

One aspect of the invention relates to a system configured to provide haptic stimulus to one or more users. In one embodiment, the system comprises a user interface, an actuator, and one or more processors. The user interface device has a content delivery portion from which sensory content is conveyed to one or more users. The actuator is configured to generate haptic stimulus associated with the sensory content being conveyed to at least one of the one or more users. The one or more processors are configured to execute computer program modules. The computer program modules comprise a stimulus module, and an actuator module. The stimulus module is configured to determine haptic stimulus to be generated for the one or more users that is associated with the sensory content being conveyed to the one or more users, wherein the haptic stimulus varies as a function of position with respect to the content delivery portion of the user interface device. The actuator control module is configured to control the actuator to generate the haptic stimulus determined by the stimulus module.

Another aspect of the invention relates to a method of providing haptic stimulus to a user. In one embodiment, the method comprises conveying content to a user at a content delivery portion of a user interface device; determining haptic stimulus to be generated for the user that is associated with the content conveyed to the user, wherein the haptic stimulus varies as a function of position with respect to the content delivery portion of the user interface device; and generating the haptic stimulus.

Yet another aspect of the invention relates to a system configured to provide haptic stimulus to a user. In one embodiment, the system comprises a user interface device, an actuator, and one or more processors. The user interface device has a content delivery portion from which sensory content is conveyed to a user. The actuator is configured to generate haptic stimulus associated with the sensory content being conveyed to the user configured to be born by a first portion of the body of the user. The one or more processors are configured to execute computer program modules, the computer program modules comprising a stimulus module and an actuator control module. The stimulus module is configured to determine haptic stimulus to be generated for the user that is associated with the sensory content being conveyed to the user, wherein the haptic stimulus varies as a function of position of the first portion of the body of the user with respect to a second portion of the body of the user. The actuator control module is configured to control the actuator to generate the haptic stimulus determined by the stimulus module.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
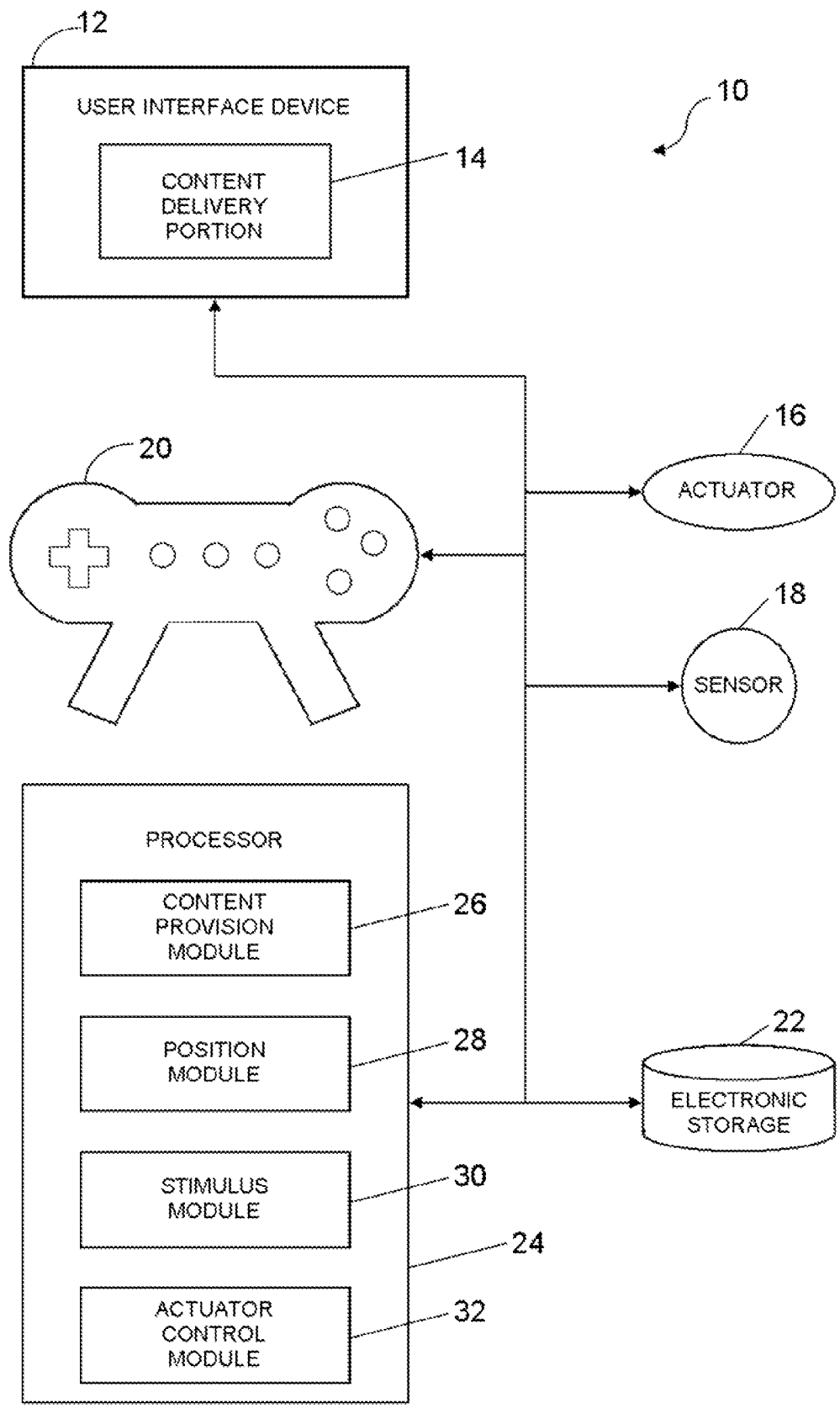
FIG. 1 illustrates a system configured to provide haptic stimulus associated with other sensory content, according to one or more embodiments of the invention.

FIG. 1 illustrates a system 10 configured to provide haptic stimulus associated with other sensory content being conveyed to one or more users. This may enhance the experience provided to the one or more users by the content. The sensory content may include video content, video game content, audio content, three-dimensional content, and/or other content. The system 10 is configured to vary the haptic stimulus associated with the other sensory content based on position information. Such position information may include information related to the position of the one or more users, the position of a controller (e.g., a game controller), the position of an actuator delivering the haptic stimulus, and/or other position information. In one embodiment, system 10 includes one or more of a user interface device 12 comprising a content delivery portion 14, one or more actuators 16, one or more sensors 18, one or more controllers 20, electronic storage 22, one or more processors 24, and/or other components.

The user interface device 12 is configured to provide sensory content to one or more users. The sensory content is conveyed to the one or more users through content delivery portion 14 of user interface device 12. In one embodiment, the user interface device 12 is configured to be positioned at a fixed location during the conveyance of content to the users, and not be moved and/or carried about by the users. This is not intended to be limiting, as one or more of the principles described herein could be extended to systems in which the user interface device is movable/portable (e.g., portable gaming systems, smartphones, etc.). In one embodiment, user interface device 12 includes an electronic display. In this embodiment, the display surface of the electronic display functions as content delivery portion 14 of user interface device 12. In one embodiment, user interface device 12 includes an audio speaker. In this embodiment, the area at which sound is emitted from user interface device 12 functions as content delivery portion 14. In one embodiment, user interface device 12 includes an electronic display and an audio speaker.

The sensory content provided to users by user interface device 12 may include video, such as movies, television, and/or other video. The sensory content provided to users by user interface device 12 may include graphics (dynamic and/or still) associated with a videogame, a virtual world, a simulation, and/or other computer generated graphics. In embodiments in which user interface device 12 conveys video, computer generated graphics, and/or other visual content to users, user interface device 12 may further provide audio content to users associated with the visual content. For example, a movie or television show, a videogame, or other types of visual content, may be associated with a sound track that is conveyed to the users simultaneously with the visual content. In one embodiment, user interface device 12 is configured to deliver audio content to the users without accompanying visual content.

In one embodiment in which user interface device 12 is an electronic display, user interface device 12 is capable of conveying three-dimensional views of content to users through a display surface that functions as content delivery portion 14. The three-dimensional views may include three-dimensional views of video content, computer generated images, and/or other visual content. By way of non-limiting example, in this embodiment, user interface device 12 may include one or more of systems employing active 3D glasses, lenticular displays, and/or other types of three-dimensional displays.

The actuators 16 are configured to generate haptic stimulus for the users. As such, at least some of actuators 16 are in contact with the users, or in contact with objects that contact the users, during conveyance of the sensory content to the users by user interface device 12. By way of non-limiting example, one or more of actuators 16 may be positioned in or on a floor surface supporting the users (e.g., installed in the floor, carried by a mat lying on the floor, etc.), one or more of actuators 16 may be carried by a brace or other wearable item worn by the users, one or more of the actuators 16 may be carried by objects that are carried by the users (e.g., carried by controllers 20), one or more of actuators 16 may be carried by furniture on which the users are seated or lying, and/or one or more of the actuators 16 may be carried by or disposed in or on other objects that contact the users.

As used herein, the term "haptic stimulus" refers to tactile feedback that is applied to the users. For example, such feedback may include one or more of vibrations, forces, and/or motions that are applied physically to the user by the actuators 16 and/or the objects with which both actuators 16 and the user are in contact. Non-contact tactile feedback in the form of ultrasonic energy, or other forms of energy may also be implemented as haptic stimulus. The actuators 16 may include any device configured to generate such feedback for application to the users. For example, actuators 16 may include one or more of a piezoelectric actuator, a pneumatic actuator, a eccentric mass actuator, an electroactive polymer actuator, an electrostatic surface actuator, shape memory alloy, and/or other actuators.

It will be appreciated that although actuators 16 are shown in FIG. 1 as a single entity, this is for illustrative purposes only. In one embodiment, actuators 16 includes a plurality of actuators. The plurality of actuators may be included in, carried by, and/or in contact with a single object or device. Or, the plurality of actuators may include actuators included in, carried by, and/or in contact with a plurality of separate objects or devices.

The sensors 18 are configured to generate output signals that convey information related to position. In one embodiment, the output signals convey information related to the position of one or more of at least one user, actuators 16 (e.g., if one or more of actuators 16 are included in or carried by a movable object), controllers 20, and/or other objects. The positions for which information is conveyed by the output signals of sensors 18 may include one or more of positions in an absolute coordinate system, positions with respect to user interface device 12 (e.g., positions with respect to content delivery portion 14), positions of one or both of actuators 16 and/or sensors 18 with respect to a user and/or the user's body parts, positions of users with respect to each other, and/or positions with respect to other objects.

One or more of any of a variety of sensors that generate output signals that convey information related to position may be implemented in system 10 as sensors 18. By way of non-limiting example, sensors 18 may include one or more of an accelerometer, a gyroscope, a digital compass, a ultrasonic echo-location sensor, an optical distance or proximity sensor, an imaging sensor (e.g., video or still imaging), RF sensors, and/or other sensors. It will be appreciated that the output signals of sensors 18 may directly convey positional information, such as distances, orientations, angles, and/or other positional information. The output signals of sensors 18 may indirectly convey positional information. For example, sensors 18 may convey information related to time derivatives of position (e.g., acceleration), images from which position can be determined, and/or other types of information from which position may be determined. The output signals may be output from sensors 18 "raw," or sensors 18 may include capabilities for providing some preliminary processing.

In one embodiment, sensors 18 include one or more sensors that are carried by other components of system 10 (e.g., actuators 16, sensors 18, etc.). In one embodiment, sensors 18 include one or more sensors that are not moved during use. In one embodiment, sensors 18 include one or more sensors that are provided as separate components that are wearable by users.

The controllers 20 are configured to provide user interaction and control with respect to system 10. In one embodiment, controllers 20 include one or more game controllers implemented by users to manipulate virtual characters and/or objects in a videogame, virtual world, and/or simulation. In one embodiment, controllers 20 include one or more electronics controllers configured to provide users with control over configurations and/or settings of one or more other components in system 10 (e.g., a remote control for user interface device 12). The controllers 20 may include handheld controllers, camera controllers that work in conjunction with handheld components (e.g., Sony PlayStation® Eye and PlayStation® Motion Controller), and/or controllers that are not handheld (e.g., flight simulation controls, driving simulation controls, etc.).

In one embodiment, electronic storage 22 comprises electronic storage media that electronically stores information. The electronic storage media of electronic storage 22 may include one or, both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 22 may store software algorithms, information determined by processor 24, content to be conveyed to users through user interface device 12, and/or other information that enables system 10 to function properly. Electronic storage 22 may be a separate component within system 10, or electronic storage 22 may be provided integrally with one or more other components of system 10 (e.g., user interface device 12, processor 24, etc.).

Processor 24 is configured to provide information processing capabilities in system 10. As such, processor 24 may include one or more of a digital processor, an analog processor, a digital circuit designed to process information, an analog circuit designed to process information, a state machine, and/or other mechanisms for electronically processing information. Although processor 24 is shown in FIG. 1 as a single entity, this is for illustrative purposes only. In some implementations, processor 24 may include a plurality of processing units. These processing units may be physically located within the same device, or processor 24 may represent processing functionality of a plurality of devices operating in coordination. For example, in one embodiment, the functionality attributed below to processor 24 is divided between a first processor provided in a computer, a videogame console, an optical disk player, and/or other home entertainment equipment, and a second processor that communicates with the first processor to provide position information to the first processor.

As is shown in FIG. 1, processor 24 may be configured to execute one or more computer program modules. The one or more computer program modules may include one or more of a content provision module 26, a position module 28, a stimulus module 30, an actuator control module 32, and/or other modules. Processor 24 may be configured to execute modules 26, 28, 30, and/or 32 by software; hardware; firmware; some combination of software, hardware, and/or firmware; and/or other mechanisms for configuring processing capabilities on processor 24.

It should be appreciated that although modules 26, 28, 30, and 32 are illustrated in FIG. 1 as being co-located within a single processing unit, in implementations in which processor 24 includes multiple processing units, one or more of modules 26, 28, 30, and/or 32 may be located remotely from the other modules. The description of the functionality provided by the different modules 26, 28, 30, and/or 32 described below is for illustrative purposes, and is not intended to be limiting, as any of modules 26, 28, 30, and/or 32 may provide more or less functionality than is described. For example, one or more of modules 26, 28, 30, and/or 32 may be eliminated, and some or all of its functionality may be provided by other ones of modules 26, 28, 30, and/or 32. As another example, processor 24 may be configured to execute one or more additional modules that may perform some or all of the functionality attributed below to one of modules 26, 28, 30, and/or 32.

The content provision module 26 is configured to control the provision of content to the users via user interface device 12. If the content includes computer generated images (e.g., in a videogame, virtual world, simulation, etc.), content provision module 26 is configured to generate the images and/or views for display to the users through user interface device 12. If the content includes video and/or still images, content provision module 26 is configured to access the video and/or still images and to generate views of the video and/or still images for display on user interface device 12. If the content includes audio content, content provision module 26 is configured to generate the electronic signals that will drive user interface device 12 to output the appropriate sounds. The content, or information from which the content is derived, may be obtained by content provision module 26 from electronic storage 22.

The position module 28 is configured to determine position information from the output signals generated by sensors 18. The position information may include information related to one or more of positions of users, positions of actuators 16, positions of sensors 18, positions of controllers 20, and/or other positions. The information related to position determined by position module 28 may describe the position of one or more objects (e.g., users, actuators 16, sensors 18, controllers 20, etc.) in an absolute coordinate system, with respect to other objects, and/or in other contexts. As used herein, "position information" or "information related to position" does not refer to gestures or movements correlated with control inputs. Instead, "position information" or "information related to position" refers simply to information that describes the position of an object, either in a coordinate system or with respect to some other object. Such information may include, without limitation, coordinates, distances, rotational orientations, and/or angular relationships.

The stimulus module 30 is configured to determine haptic stimulus to be generated for the user. Determining the haptic stimulus includes determining which one(s) of actuators 16 should apply the stimulus, and/or determining one or more parameters of the haptic stimulus. Such one or more parameters may include one or more of magnitude of force, directivity and orientation, location of the stimulus, frequency of vibration, magnitude, duration, and/or other parameters.

The haptic stimulus determined by stimulus module 30 is associated with the sensory content being conveyed by user interface device 12. As such, the stimulus may be dictated, at least to some extent, by the information stored electronically with the content (e.g., on electronic storage 22). The haptic stimulus is determined by stimulus module 30 to enhance one or more aspects of the experience provided by the content. For example, the haptic stimulus may be determined to enhance one or more of the realism of the content, the enjoyability of content, perception of the content by the users, and/or other aspects of the experience provided by the content being conveyed to the users via user interface device 12.

To enhance the one or more aspects of the experience provided by the content being conveyed to the users via user interface device 12, stimulus module 30 is configured to determine the haptic stimulus based on information related to position. This includes varying the haptic stimulus based on user position with respect to user interface device 12, position of one body part of a user with respect to another body part of the user, position of one user with respect to one or more other users, and/or position information. In varying the haptic stimulus based on position, stimulus module 30 may change the stimulus in distinct steps, or smoothly. For example, if user interface device 12 is configured to provide three-dimensional views at discrete, predetermined viewing angles with respect to the display surface functioning as content delivery portion 14, then stimulus module 30 may vary the haptic stimulus such that each of the predetermined viewing angles receives haptic stimulus corresponding to its three-dimensional view. As another example, if one user is standing behind another user with respect to user interface device 12, the haptic stimulus provided to the user that is further away may reflect "shielding" by the user standing in the middle.

The determination of the haptic stimulus to account for position information may be based on determinations of position information by position module 28, and/or position information related to the positions of actuators 16 that is prestored or configured. It will be appreciated that the discussion of varying haptic stimulus based on position information described herein is distinct from varying haptic stimulus based on input or control gestures. The determination of haptic stimulus based on position by stimulus module 30 is not dependent on a gesture or physical maneuver being performed by a user. Instead, haptic stimulus determined by stimulus module 30 that corresponds to a given control or input gesture would vary based on the position of the user (or relative positions of the users body parts) during performance of the control or input gesture). Similarly, haptic stimulus that does not correspond to a control or input gesture (e.g., associated with an effect or component of the content being conveyed to the user) may be determined by stimulus module 30 to vary based on similar position information.

In one embodiment, stimulus module 30 determines haptic stimulus to be generated for a user to coincide with the directivity and orientation of an effect in the content being conveyed to the user. For example, if user interface device 12 is configured to generate three-dimensional images through a display surface functioning as content delivery portion 14, the haptic stimulus is varied as a function of viewing angle, distance from content delivery portion 14, and/or both viewing angle and distance to convey the directivity and orientation of a visual entity in a three-dimensional view being conveyed by user interface device 12. Other position-related parameters may be used instead, or in conjunction with, viewing angle and/or distance to vary the haptic stimulus.

As a specific instance of this example, if a ball in the three-dimensional view is projected outward away from content delivery portion 14 along a path, the haptic stimulus is determined by stimulus module 30 to mimic being hit by the ball for users positioned on or near the path. Users positioned off of the path, on the other hand, would not receive such stimulus. It will be appreciated that some other projectile may be substituted for the ball. As another specific instance of this example, if an explosion is shown in the three-dimensional view, the haptic stimulus can be used to enhance the realism of the explosion. This would include determining the magnitude, amount, and/or type of haptic stimulus to coincide with the directivity and orientation of the explosion.

These instances of generating haptic stimulus to coincide with the directivity and/or orientation of an effect in a three-dimensional view being conveyed by user interface device 12 are not intended to be limiting. Other instances of this exemplary use of position information to determine haptic stimulus may be implemented without departing from the scope of this disclosure. It will be appreciated that the description of varying haptic stimulus to reflect the directivity and/or orientation of events in the content being conveyed by user interface device 12 are not limited to three-dimensional views, or even to visual effects. The same principles may be applied to effects in two-dimensional views, and/or to audio effects.

In one embodiment, actuators 16 include one or more actuators that are fixed positionally with respect to user interface device 12 during conveyance of the content. For example, actuators 16 may include actuators carried by or included in furniture, a floor, a mat, and/or other objects that are fixed during conveyance of the content. In this embodiment, stimulus module 30 may determine haptic stimulus for the fixed positions of actuators 16. Position information related to these fixed positions may include one or more of position information that is preconfigured and/or prestored for use by stimulus module 30.

In one embodiment, actuators 16 include one or more actuators that are included in or carried by objects that are worn, carried, or otherwise moved by the user. In this embodiment, the haptic stimulus to be generated by the portable actuators is determined by stimulus module 30 based on position information received by stimulus module 30 from position module 28 that is related to the position of the users and/or the movable actuators with respect to user interface device 12. For example, the movable actuators may be included in game controllers, wearable braces, a pillow, a stuffed animal, a toy, and/or other objects.

In one embodiment, the stimulus module 30 is configured to determine the haptic stimulus based on the relative positions of body parts of a user. For example, if the user is holding one of controllers 20, position module 28 may determine the position of the controller 20 with respect to the trunk of the user. As the controller 20 gets closer to, or farther away from the user, the haptic stimulus determined by stimulus module 30 may vary based on the change in relative position. This change may be made simply by including the relative position between the trunk of the user and controller 20 in a determination of the position of the user with respect to user interface device 12 (e.g., instead of assuming 20 to reflect the position of the user without adjustment), or the change may be made specifically based on motion of the controller 20 into and/or away from the trunk of the user.

In one embodiment, the stimulus takes into account both the position of the user (and/or the controller 20) with respect to the user interface device 12 and the position of the controller with respect to the user. For example, the stimulus determined for the user in response to the user moving the controller 20 from his body to an arms length away from his body may be different from leaving the controller 20 at his body but stepping forward an arm's length. Similarly, stepping forward half and arm's length while extending his arm's halfway may result in a different stimulation than either of moving only the arms or only stepping forward.

In one embodiment, the haptic stimulus is determined to vary based on a rotational orientation of the controller 20 with respect to the trunk of the user, or other information related to the relative positions of the controller 20 with respect to the trunk of the user.

The actuator control module 32 is configured to control actuators 16 to generate the haptic stimulus determined by stimulus module 30. This includes communicating the haptic stimulus to be generated from processor 24 to actuators 16. The haptic stimulus to be generated may be communicated over wired communication links, wireless communication links, and/or other communication links between processor 24 and actuators 16. In one embodiment, at least a portion of the functionality attributed to the actuator control module 32 is disposed in a processor carried by controller 20, and/or some other object that carries one or more of actuators 16.

Figure 2:
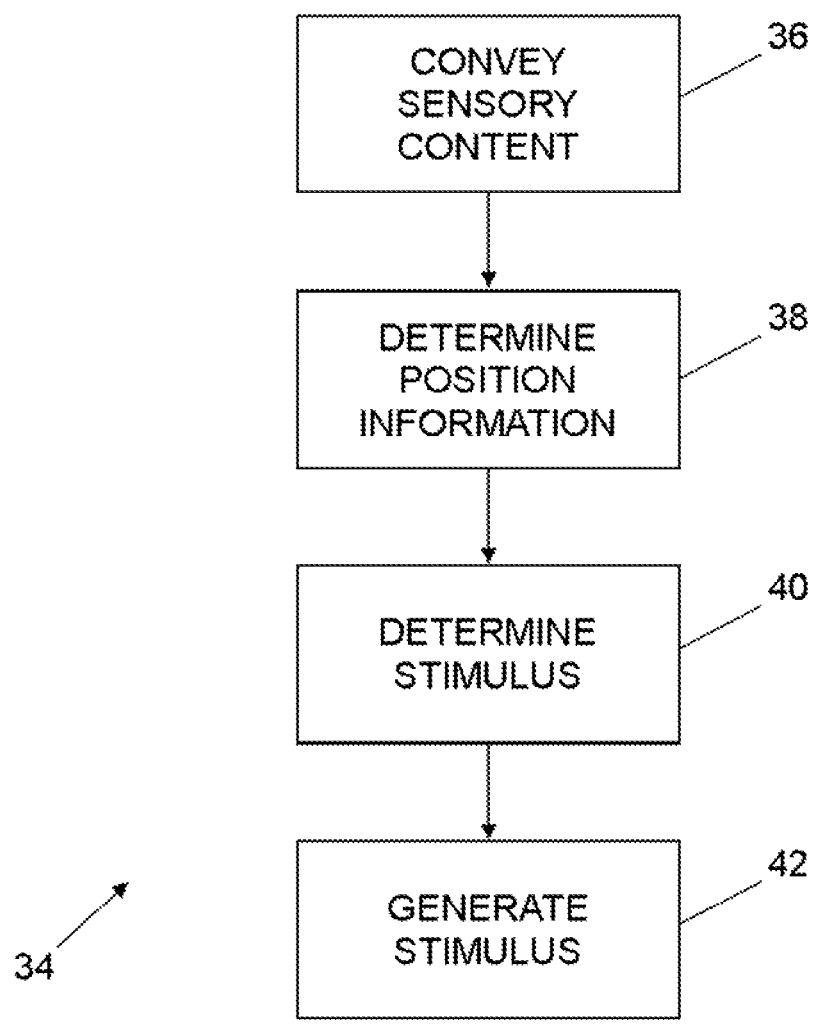
FIG. 2 illustrates a method of providing haptic stimulus associated with other sensory content, in accordance with one or more embodiments of the invention.

FIG. 2 illustrates a method 34 of providing haptic stimulus associated with other sensory content being conveyed to one or more users. The operations of method 34 presented below are intended to be illustrative. In some embodiments, method 34 may be accomplished with one or more additional operations not described, and/or without one or more of the operations discussed. Additionally, the order in which the operations of method 34 are illustrated in FIG. 2 and described below is not intended to be limiting.

In some embodiments, method 34 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 34 in response to instructions stored electronically on an electronic storage medium. The one or more processing devices may include one or more devices configured through hardware, firmware, and/or software to be specifically designed for execution of one or more of the operations of method 34.

At an operation 36, sensory content is conveyed to one or more users. The sensory content may include visual content, audio content, and/or other sensory content. The sensory content is conveyed to the one or more users by a user interface device similar to or the same as user interface device 12, having a content delivery portion similar to or the same as content delivery portion 14 (shown in FIG. 1 and described above).

At an operation 38, position information may be determined. The position information may be related to the position(s) of one or more of a user, one or more body parts of a user, a controller (e.g., a game controller), an actuator, and/or other objects. The position information may indicate position in an absolute coordinate system, relative to the user interface device, the content delivery portion, a user, and/or other objects. In one embodiment, operation 38 is performed by a position module similar to or the same as position module 28 (shown in FIG. 1 and described above).

At an operation 40, haptic stimulus to be generated for the one or more users is determined. The haptic stimulus is associated with the content conveyed to the user. The haptic stimulus is determined such that it varies as a function of position information. The position information may describe the position of one or more of a user, one or more body parts of a user, a controller (e.g., a game controller), an actuator, and/or other objects. The position information may indicate position in an absolute coordinate system, relative to the user interface device, the content delivery portion, a user, and/or other objects. The position information may include the position information determined at operation 38, position information that is preconfigured and/or prestored, and/or other position information. In one embodiment, operation 40 is performed by a stimulus module similar to or the same as stimulus module 30 (shown in FIG. 1 and described above).

At an operation 42, the haptic stimulus is generated for the user. In one embodiment, operation 42 is performed by one or more actuators similar to or the same as actuators 16 (shown in FIG. 1 and described above).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to provide haptic stimulus to one or more users, the system comprising:
   a user interface device including an electronic display having a display surface from which three-dimensional views of visual content are conveyed to the one or more users at discrete, predefined viewing angles, the visual content comprising an event;
   a first actuator configured to generate haptic stimulus associated with the visual content being conveyed to a first user by the display surface; and
   one or more processors configured to execute computer program modules, the computer program modules comprising:
   a stimulus module configured to determine haptic stimulus to be generated for the first user that is associated with the visual content being conveyed to the first user by the display surface based on a first viewing angle of the first user with respect to the display surface, the haptic stimulus selected from a set of haptic stimulus for the event corresponding to individual discrete, predetermined viewing angles that are different from each other; and
   an actuator control module configured to control the first actuator to generate the haptic stimulus determined by the stimulus module for the first user.

2. The system of claim 1, further comprising a second actuator configured to generate haptic stimulus associated with the visual content being conveyed to a second user by the display surface, wherein the stimulus module is further configured to determine haptic stimulus to be generated for the second user that is associated with the visual content being conveyed to the second user by the display surface based on a second viewing angle of the second user with respect to the display surface, and wherein the actuator control module is further configured to control the second actuator to generate the haptic stimulus determined by the stimulus module for the second user.

3. The system of claim 2, wherein the stimulus module is configured such that responsive to the first viewing angle being different from the second viewing angle, the haptic stimulus associated with the event for the first user is different than the haptic stimulus associated with the event for the second user.

4. The system of claim 1, wherein the differences in haptic stimulus associated with the event for the individual discrete, predetermined viewing angles reflect a directivity and orientation of a visual effect associated with the event in the three-dimensional views being conveyed at the discrete, predetermined viewing angles.

5. The system of claim 1, further comprising:
   a sensor configured to generate output signals conveying information related to the position of the first user with respect to the display surface; and
   wherein the computer program modules further comprise:
   a position module configured to determine a viewing angle of the first user with respect to the display surface based on the output signals generated by the sensor, and
   wherein the stimulus module is configured such that the haptic stimulus associated with the event for the first user is determined based on the determination of viewing angle made by the position module.

6. The system of claim 5, wherein the sensor is configured such that the output signals convey information related to the position of a handheld controller associated with the first user.

7. The system of claim 6, wherein the actuator is carried by the handheld controller.

8. The system of claim 5, wherein the sensor is configured such that the output signals convey an image that includes the first user, and the position module is configured to determine the viewing angle of the first user with respect to the display surface based on analysis of the image.

9. The system of claim 1, wherein the stimulus module is configured such that the haptic stimulus varies as a function of viewing angle with respect to the display surface without regard for distance from the display surface.

10. The system of claim 1, wherein the content conveyed to the one or more users through the user interface device includes scenes of a videogame.

11. A method of providing haptic stimulus to a user, the method comprising:
conveying three-dimensional views of visual content to a first user at a display surface of an electronic display included in a user interface device, the visual content including a visual depiction of an event and the three-dimensional views are viewable at discrete, predetermined viewing angles;
determining haptic stimulus associated with the event to be generated for the first user such that the haptic stimulus is determined based on a first viewing angle of the first user with respect to the display surface by selecting from a set of separate haptic stimulus associated with the event corresponding to individual discrete, predetermined viewing angles that are different from each other; and
generating the haptic stimulus for the first user in coordination with display of the visual depiction of the event.

12. The method of claim 11, further comprising determining haptic stimulus associated with the event to be generated for a second user such that the haptic stimulus is determined based on a second viewing angle of the second user with respect to the display surface.

13. The method of claim 12, wherein responsive to the first viewing angle being different than the second viewing angle, the haptic stimulus associated with the event for the first user is different from the haptic stimulus associated with the event for the second user.

14. The method of claim 11, wherein the differences in haptic stimulus associated with the event for the individual discrete, predetermined viewing angles reflect a directivity and orientation of a visual effect associated with the event in the three-dimensional views being conveyed at the discrete, predetermined viewing angles.

15. The method of claim 11, further comprising:
determining the first viewing angle of the first user with respect to the display surface, and
wherein the determination of haptic stimulus associated with the event to be generated for the first user is based on the determination of the first viewing angle.

16. The method of claim 15, wherein determining the viewing angle of the first user comprises determining information related to the position of a handheld controller associated with the first user.

17. The method of claim 15, wherein the haptic stimulus is generated by the handheld controller.

18. The method of claim 15, wherein determining the first viewing angle of the user comprises capturing an image that includes the first user, and analyzing the captured image to determine the first viewing angle with respect to the display surface.

19. The method of claim 11, wherein the determined haptic stimulus varies as a function of the first viewing angle with respect to the display surface without regard for distance of the first user from the display surface.

20. A system configured to provide haptic stimulus to one or more users, the system comprising:
a user interface device including an electronic display having a display surface from which views of visual content are conveyed to the one or more users, the visual content comprising an event;
a first actuator configured to generate haptic stimulus associated with the visual content being conveyed to a first user by the display surface;
a second actuator configured to generate haptic stimulus associated with the visual content being conveyed to a second user by the display surface; and
one or more processors configured to execute computer program modules, the computer program modules comprising:
a stimulus module configured to
determine haptic stimulus to be generated for the first user that is associated with the visual content being conveyed to the first user by the display surface based on a first viewing angle of the first user with respect to the display surface, and
determine haptic stimulus to be generated for the second user that is associated with the visual content being conveyed to the second user by the display surface based on a second viewing angle of the second user with respect to the display surface,
wherein responsive to the first viewing angle being different from the second viewing angle, the haptic stimulus associated with the event for the first user is different than the haptic stimulus associated with the event for the second user; and
an actuator control module configured to control the first actuator to generate the haptic stimulus determined by the stimulus module for the first user and to control the second actuator to generate the haptic stimulus determined by the stimulus module for the second user.

21. A method of providing haptic stimulus to a user, the method comprising:
conveying visual content to a first user at a display surface of an electronic display included in a user interface device, the visual content including a visual depiction of an event;
determining haptic stimulus associated with the event to be generated for the first user such that the haptic stimulus is determined based on a first viewing angle of the first user with respect to the display surface;
determining haptic stimulus associated with the event to be generated for a second user such that the haptic stimulus is determined based on a second viewing angle of the second user with respect to the display surface; and
generating the haptic stimulus for the first user in coordination with display of the visual depiction of the event, wherein responsive to the first viewing angle being different than the second viewing angle, the haptic stimulus associated with the event for the first user is different from the haptic stimulus associated with the event for the second user.

* * * * *